(No Model.)
N. TUFTS.
LANTERN.
No. 277,086. Patented May 8, 1883.
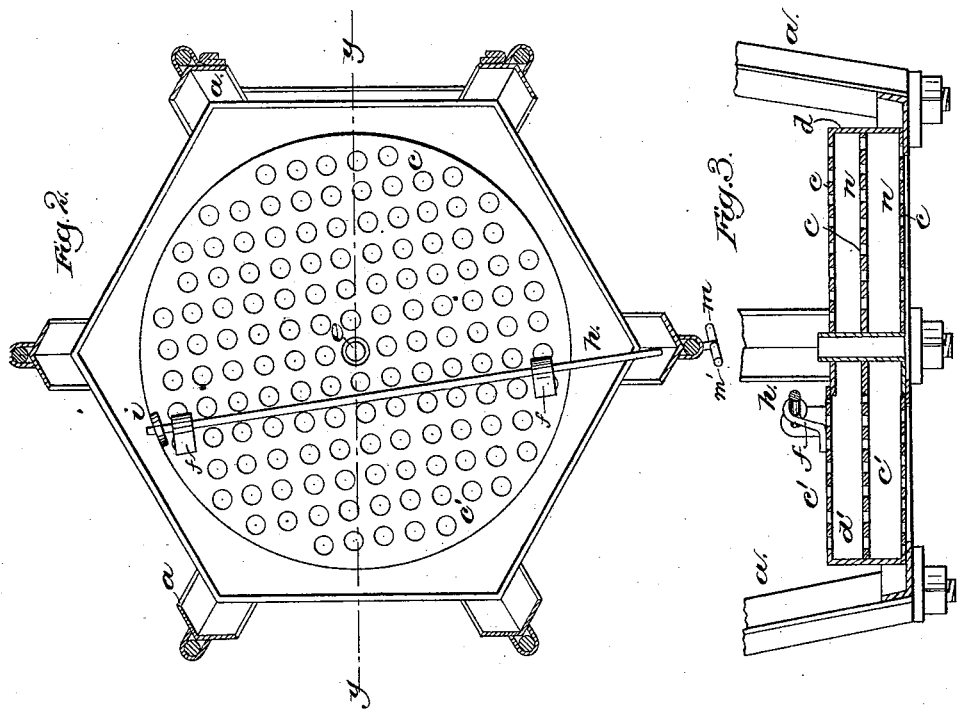
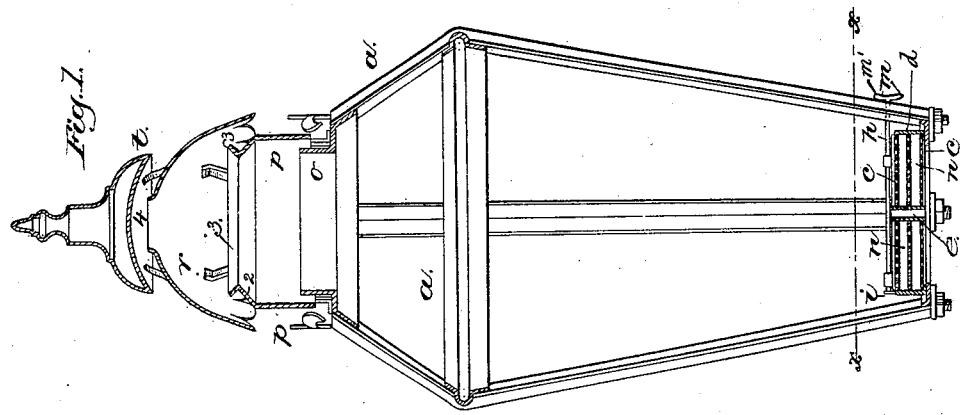
Witnesses.
Fred A. Powell.
Inventor:
Nathaniel Tufts.
by Crosby & Gregory attys

UNITED STATES PATENT OFFICE.

NATHANIEL TUFTS, OF BOSTON, MASSACHUSETTS.

LANTERN.

SPECIFICATION forming part of Letters Patent No. 277,086, dated May 8, 1883.

Application filed December 8, 1882. (No model.)

*To all whom it may concern:*

Be it known that I, NATHANIEL TUFTS, of Boston, county of Suffolk, State of Massachusetts, have invented an Improvement in Lanterns, of which the following description, in connection with the accompanying drawings, is a specification, like letters on the drawings representing like parts.

My invention relates to a lantern or light for illuminating streets or the entrance to public halls, or for similar use, in which the lantern is exposed to the direct action of the wind and weather. In that class of lanterns or street-lamps containing a cluster of several burners, upon which my invention is an improvement, it is essential that the air for combustion should be very uniformly supplied, as any currents or sudden gusts direct the mass of flame against the glass, and cause it to crack by the sudden change of temperature, and uneven currents generally cause the flame to smoke the glass. This uniform distribution of the air has heretofore been effected by a complicated and expensive ventilating apparatus projecting below the base of the lantern proper.

I have discovered by the employment of two or more perforated or foraminous diaphragms and intermediate chambers, constituting the bottom of the lantern, that air to support combustion will be admitted properly and with uniformity and in sufficient quantity under all the various atmospheric conditions. A portion of the foraminous plate is hinged or pivoted, so that it may be turned as a door to afford an opportunity for the introduction of a torch to light the burners. The top of the lantern or outlet for the products of combustion is devised to prevent currents of air from entering and passing downward into the lantern.

Figure 1 is a vertical section of a lantern embodying this invention; Fig. 2, a horizontal section thereof on line $x\,x$, Fig. 1, on a large scale; and Fig. 3, a vertical section of the lower portion of the lantern on line $y\,y$, Fig. 2.

The main portion of the lantern, consisting of the metallic frame-work $a$, containing panes of glass, may be of any usual or suitable shape and construction, the glass being preferably set as nearly air-tight as possible.

The lower end of the lantern is provided with a ventilating bottom piece composed of a series of two or more perforated or foraminous plates, $c$, alternating with air-spaces $n$, they being contained in a cylindrical casing, $d$, and having a tubular passage, $e$, at their middle, for the gas-pipe by which the burners are to be supplied. A portion, $c'$, of the said plates and the attached portion $d'$ of their frame-work is connected by ears $f$ with a rod or shaft, $h$, having one end pivoted in a lug, $i$, and its other end extending out through the side of the lantern, it being shown as passing through and borne by one of the uprights of the frame-work thereof. The said shaft $h$ is provided with lateral arms $m\,m'$, at the outside of the lantern, one of which, $m$, may be engaged by the usual torch to turn the said shaft and connected portion $c'\,d'$ of the bottom plate of the lantern, to thus afford an opening through which the torch may pass into the lantern to light the burners. After the burners are lighted the shaft $h$ is turned back by the arm $m'$, thus again closing the bottom of the lantern. The lowermost one of the plates $c$ breaks up the currents of air striking against it, a portion of the air passing with reduced violence through the perforations into the chambers or space between the said plate and the next one above it, from which it rises and is uniformly distributed through the perforations of the upper plates, arriving at the flame in a steady evenly-distributed current. The products of combustion pass out the upper portion of the lantern through a short outlet passage or tube, $o$, delivering into a larger tube or petticoat, $p$, surrounding the said tube, and inclined or contracted near its top, as shown at 2, and then oppositely inclined or flared, as shown at 3, to form a deflecting-flange, by which lateral blasts of wind will be turned outward and upward and be prevented from passing downward into the interior of the lantern. The said cylinder or petticoat $p$ is surmounted by a dome, $r$, open at its top, and having its upper edges turned upward, as shown at 4, the said opening being covered and protected from the weather by a cap, $t$.

I am aware that it is not new to make a lamp in which a foraminous casing depends from and below the bottom of the frame, and terminates within the frame in foraminous horizontal plates; but I am not aware of a street-lamp the bottom of the frame of which is composed solely of foraminous horizontal plates having alternate air-spaces and a surrounding imperforate shell, so that the air-currents to be directed are vertical, and not first horizontal and then vertical, as in the other construction. Furthermore, I am aware that it is not new to hinge a portion of the bottom of lamps to admit of a torch; but I am not aware of a perforated bottom so constructed and provided with means that it can be opened to permit the insertion of means for lighting and extinguishing. Such unperforated hinged bottoms have been provided with an operating-knob, but not with oppositely-inclined arms to effect the opening and closing of the hinged portion. Furthermore, the domes of street-lamps have been provided with a variety of forms of ventilators or cowls, one of which has a chimney provided with a a contracted opening corresponding with my petticoat $p$ and its incline 2; but, so far as I am aware, no prior use has been made of the flange 3, either identically or in equivalence. My invention, as thus distinguished from its predecessors, then consists, essentially, in improvements on them, and the claims are hereby to this extent limited.

I claim—

1. The combination, with the main frame-work $a$ of a lantern, of a bottom composed of the series of horizontal foraminous plates and alternating air-spaces provided with a passage for the gas-pipe, and surrounded by an imperforate rim, the said bottom arranged wholly within the said frame-work, so as not to project below the same, substantially as shown and described.

2. The combination, with the main frame-work $a$ of a lantern, and the bottom thereof, composed of the series of horizontal foraminous plates $c$, alternating air-spaces, cylindric casing $d$, and gas-pipe passage $e$, all arranged wholly within said frame-work, of the portions $c'$ $d'$ of said bottom, and hinging-ears $f$ and shaft $h$, substantially as shown and described.

3. The combination, with the main frame-work $a$ of a lantern, and the bottom thereof, composed of the series of horizontal foraminous plates $c$, alternating air-spaces, cylindric casing $d$, and gas-pipe passage $e$, all arranged wholly within said frame-work, of the portions $c'$ $d'$ of said bottom, and hinging ears $f$ and shaft $h$, the latter provided with the lateral operating-arms $m$ $m'$, substantially as shown and described.

4. In a lantern, the outlet-passage, combined with the petticoat surrounding the said passage, and having the contraction 2 and oppositely-inclined deflecting-flange 3, substantially as and for the purpose set forth.

5. In a lantern, the outlet-passage surrounded by the petticoat $p$, having the contraction 2, and the flaring deflecting-flange 3, combined with the open-top dome surmounting the said petticoat, and the cap protecting the opening of the said dome, substantially as described.

In testimony whereof I have signed my name to this specification in the presence of two subscribing witnesses.

NATHANIEL TUFTS.

Witnesses:
G. W. GREGORY,
BERNICE J. NOYES.